United States Patent [19]

Rowland

[11] Patent Number: 5,511,808
[45] Date of Patent: Apr. 30, 1996

[54] FLEXIBLE FENDER MOUNT

[75] Inventor: Rodney K. Rowland, Brno-Lisen, Czech Rep.

[73] Assignee: Deere & Company, Moline, Ill.

[21] Appl. No.: 283,016

[22] Filed: Jul. 29, 1994

[51] Int. Cl.⁶ ............................ B62D 25/16
[52] U.S. Cl. .................. 280/157; 280/847; 280/848
[58] Field of Search .................. 280/154, 156, 280/157, 847, 848, 849, 850, 854; 267/294, 141.1

[56] References Cited

FOREIGN PATENT DOCUMENTS 0310781  4/1929  United Kingdom ............ 280/847

OTHER PUBLICATIONS

Color photocopy of photo taken in Jan. 1993 of a spring--biased, hinged pivoting fender device, believed to have been designed by SAME.

Primary Examiner—Richard M. Camby
Assistant Examiner—Frank Vanaman

[57] ABSTRACT

A vehicle has a steerable wheel on an axle, a fender, and a fender mount for supporting the fender on the axle adjacent to the steerable wheel. The fender mount has a bracket fixed to the axle, an arm fixed to the fender and a flexible bushing coupled between the bracket and the arm. The bushing is rotatably flexible about a torsion axis and is bendably flexible in directions transverse to the torsion axis. The bushing includes a flexible core and a pair of wedge-shaped end caps fixed to opposite ends of the core. The bushing has a central axis which is tilted rearwardly with respect to a fore-and-aft axis of the wheel and which is tilted away from the wheel.

12 Claims, 5 Drawing Sheets

FLEXIBLE FENDER MOUNT

BACKGROUND OF THE INVENTION

The invention relates to a flexible mounting for a fender for a steerable wheel.

Many farm tractors have fenders for the front wheels to control the splattering of mud and snow. But, such fenders may engage a body panel or the frame of the tractor when the front wheels are turned at a sharp angle. This can cause damage to the fender or to the body panel, or it may limit the turn angle and maneuverability of the tractor. This may be especially a problem for row crop tractor which has wheels which are set narrowly for use in row crops. Various designs have been proposed in attempts to solve this problem by having the fender be pivotal with respect to the fender. For example, U.S. Pat. No. 5,074,573 issued 24 Dec. 1991 to Dick, shows a flexible mounting for a fender for a steerable wheel wherein fender support arms are fixed to a sleeve which is rotatable on a shaft fixed to a front frame part and a torsion spring couples the sleeve to the shaft. This design includes a separate stop which is mounted on the axle and which engages a fender support arm to prevent engagement between the fender and a body panel of the tractor. This design requires the operator or a mechanic to adjust a fender stop based on tire size or tread width.

U.S. Pat. No. 332,022 issued 8 Dec. 1885 to Todd, shows a flexible mounting for a fender for a steerable wheel wherein fender support arms are fixed to one end of a torsion or spring rod. The other end of the spring rod is pinned inside a tubular support which is fixed to the front axle. When the wheel pivots, the end of the fender will come against the side of the vehicle or a guard thereon, while the wheel continues to pivot.

French Pat. No. 676,216 issued 19 Nov. 1929 to Thevin, shows a flexible mounting for a mudguard for a steerable wheel wherein a mudguard brace is fixed to one end of a coil spring. The other end of the coil spring rod fixed to a casing which is fixed to a support which pivots with the wheel as it is steered. In all these prior designs the fender mounting permits only a rotating or pivoting movement. It would be desirable to provide a flexible fender mounting which permits pivoting and bending motion so that, in addition to yeilding in response to the fender contacting the frame or body of the tractor as a result of the wheel being steered, it will also yeild or bend to accommodate impacts to the fender from objects other than the frame or body of the tractor.

Ideally, the optimum pivot center of a fender would be at the center of the tire where the fender clearance would be maintained throughout its deflection. But, such a pivot location is difficult to achieve given standard wheel and outboard planetary drive axle designs.

SUMMARY OF THE INVENTION

Accordingly, an object of this invention is to provide a flexible fender mount has the flexibility to bend as well as pivot around an axis.

A further object of this invention is to provide a flexible fender mount which does not require the operator or mechanic to adjust a fender stop based on tire size or tread width.

A further object of this invention is to provide a flexible fender mount which can be easily installed on a tractor.

Another object of this invention is to provide a flexible fender mount which is durable and low cost to manufacture.

These and other objects are achieved by the present invention, wherein a flexible fender mount includes a bracket fixed to the axle, a pair of arms fixed to the fender, and a flexible bushing coupled between the bracket and the arms. The bushing is rotatable about a torsion axis and is bendable in directions transverse to the torsion axis. The flexibility of the bushing to bend as well as pivot around its axis isolates or dampens the fender from fatigue of hard shocks from axle and tire dynamics. The bushing includes a flexible core and a pair of wedge-shaped end caps fixed to opposite ends of the core. The bushing has a central axis which is tilted rearwardly with respect to a fore-and-aft axis of the wheel and which is tilted inwardly away from the wheel. This pivot geometry effectively lifts the fender as it is deflected, thereby maintaining adequate clearance through a greater range of deflection.

DETAILED DESCRIPTION

Figure 1:
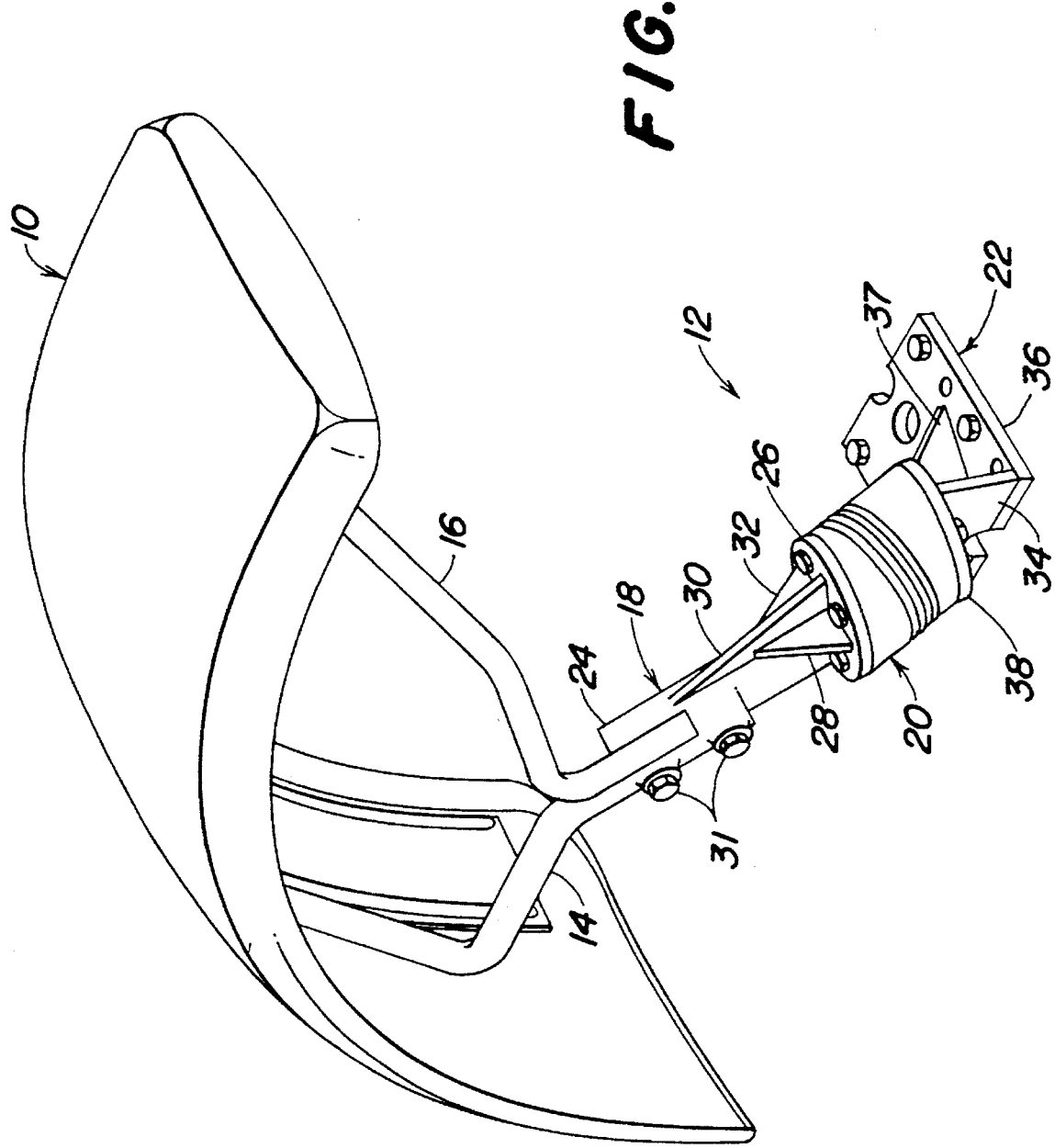
FIG. 1 is a perspective view of a flexible fender mount according to the present invention.
Figure 2:
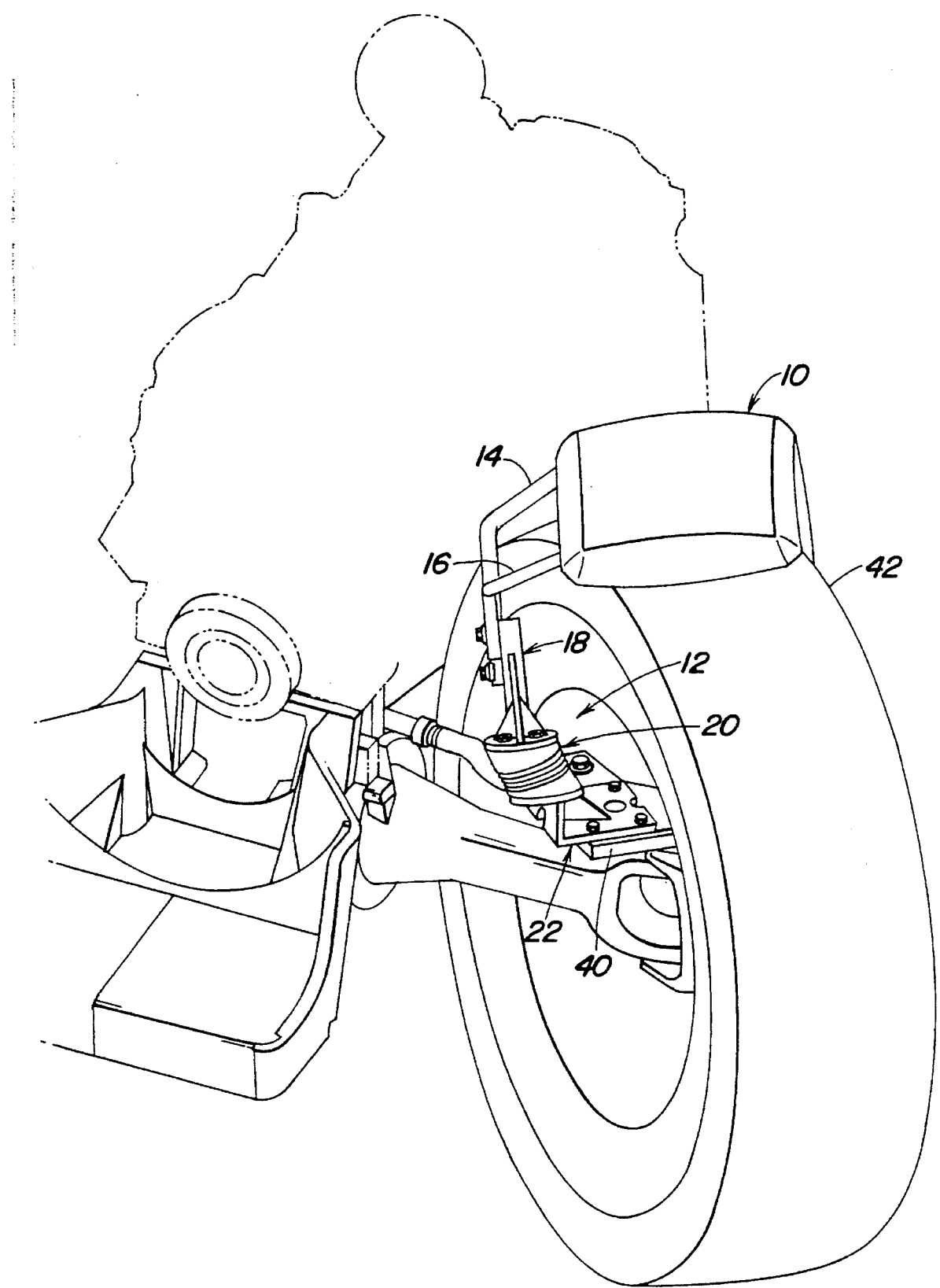
FIG. 2 is a perspective view of a flexible fender mount according to the present invention installed on an axle next to a steerable wheel.

Referring to FIGS. 1 and 2, a fender 10 is supported by a fender mount 12. The fender mount 12 includes first and second arms 14 and 16. The outer end of each arm 14,16 is fixed, such as by welding to the fender support rods on the inside surface of the fender 10. The fender 10 is fixed by bolts to the fender support structure. The inner ends of each arm 14,16 are welded together. The inner end of arm 14 is slightly longer than end 16 and has apertures so that it may be bolted to a support bracket or fixture 18. The lower part of fixture 18 is fixed to an upper end of a flexible bushing or spring/damper 20. The lower part of bushing 20 is fixed to an upper end of mounting bracket 22.

Figure 4:
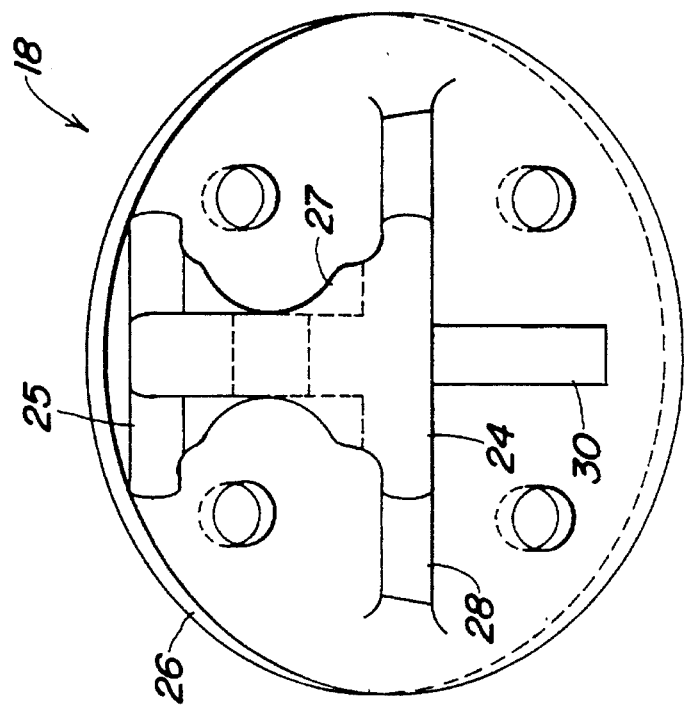
FIG. 4 is a view of the support bracket portion of the present invention in the direction of arrows 4—4.
Figure 3:
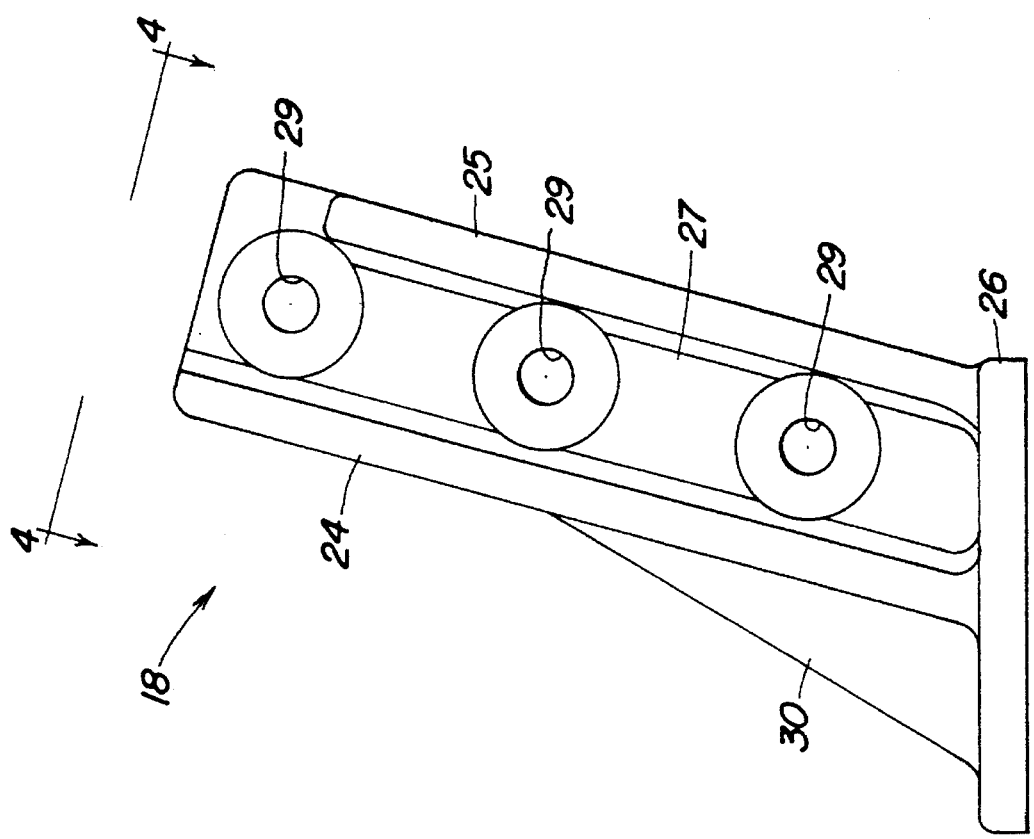
FIG. 3 is a side view of the support bracket portion of the present invention.

As best seen in FIGS. 3 and 4, the fixture 18 includes a pair of plates 24 and 25 and a wall 27 therebetween, all which projects from a disc-shaped base 26. As best seen in FIG. 4, the wall 27 has concave sides which are adapted to receive the fender support arm 14. A plurality, for example 3, bores 29 are formed in the wall 27 so that arm 14 can be attached to wall 27 by means of bolts 31 which extend through corresponding bores in the arm 14. Triangular braces 28, 30 and 32 maintain the rigidity of the plates 24 and 25 with respect to the base 26. As best seen in FIG. 3, the plates 24, 25 and wall 27 are tilted at angle of approximately 15 degrees with respect to a line normal to the base 26 so that they will extend upwardly and rearwardly from the base 26.

Figure 7:
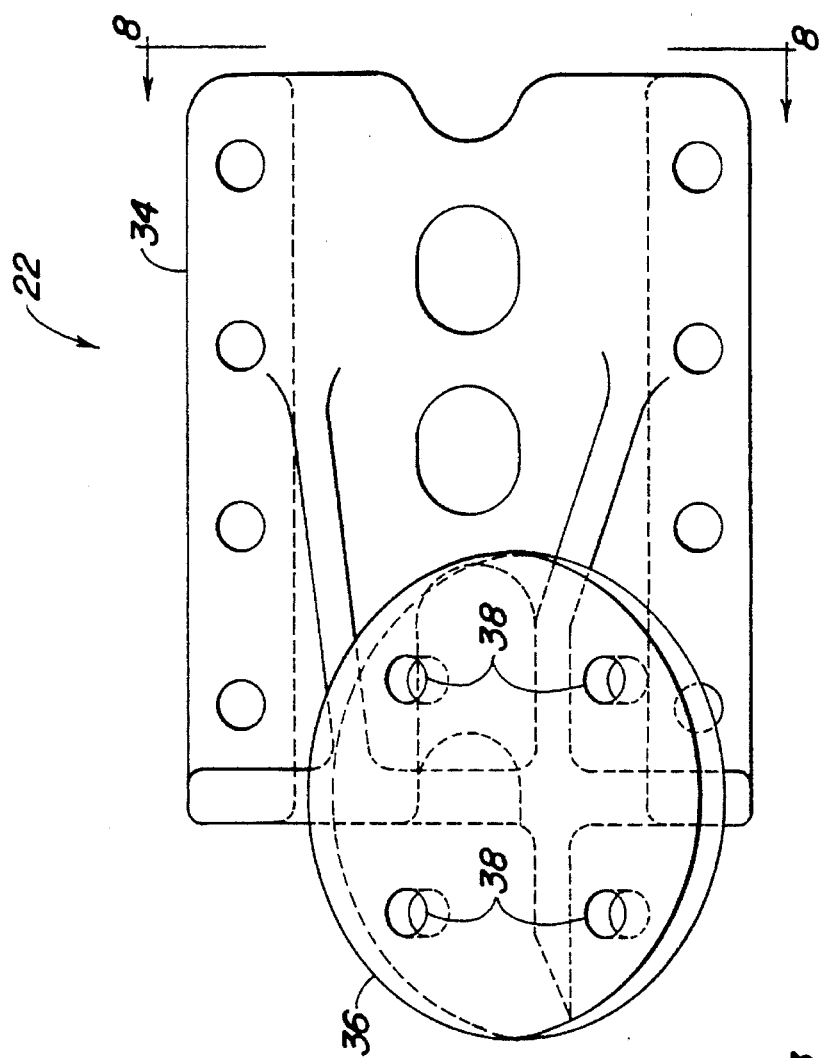
FIG. 7 is a top view of the mounting bracket portion of the present invention.
Figure 8:
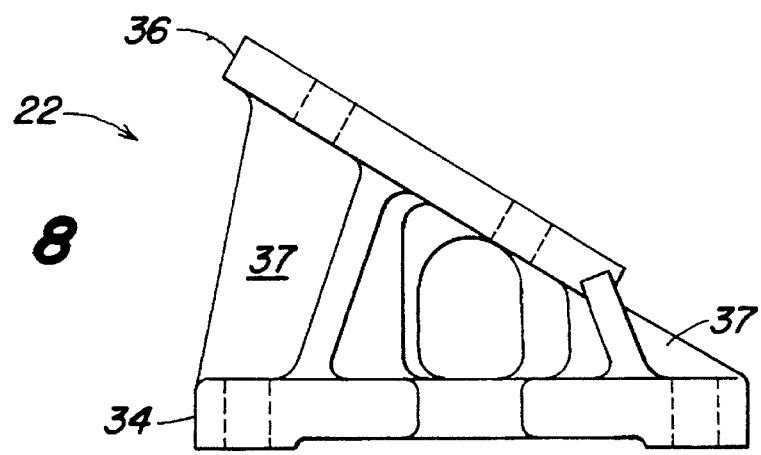
FIG. 8 is a side view of the mounting bracket portion of the present invention in the direction of arrows 8—8.

As best seen in FIGS. 7 and 8, the mounting bracket 22 includes a generally rectangular plate 34 and a support disc 36 supported on the plate 34 by a plurality of support members 37. The disc 36 has a set of holes 38 so that it may be bolted to the lower end of bushing 20. As best seen in FIG. 2, the plate 34 is preferably bolted to a steering arm 40 of the axle which pivots with the tire 42. As best seen in FIG. 8, the disc 36 is tilted at an angle of approximately 20 to 30 degrees downward to the rear with respect to the horizontal plate 34. When mounted on the axle part 40, the disc 36 is tilted at an angle of approximately 20 to 30 degrees downward to the rear with respect a fore-and-aft axis of the tire 42.

Figure 5:
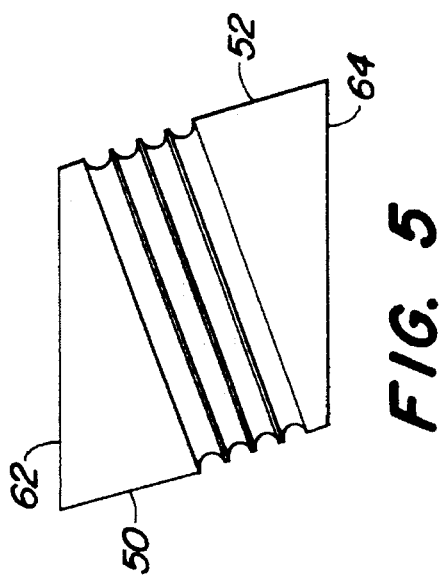
FIG. 5 is a side view of the flexible bushing portion of the present invention.
Figure 6:
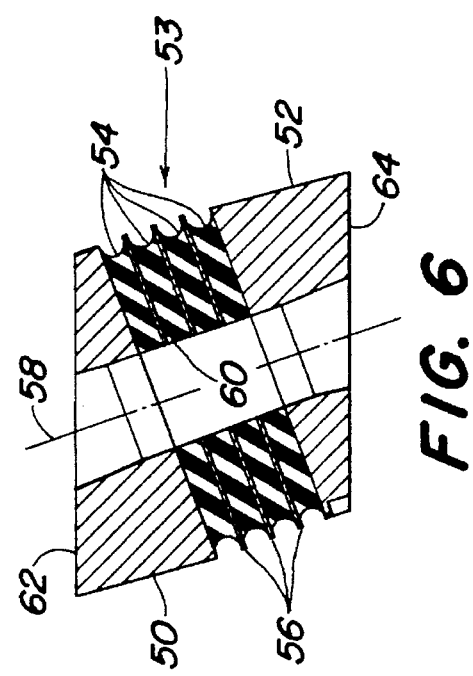
FIG. 6 is a sectional view of the flexible bushing portion of the present invention.

Turning now to FIGS. 5 and 6, the bushing 20 includes a upper end cap 50, a lower end cap 52 and a flexible cylindrical core 53 formed by a stack of a annular rubber discs 54 and annular steel shims 56. One of the shims 56 is positioned between adjacent ones of the rubber discs 54. As best seen in FIG. 4, the core 53 defines a central axis 58 and a bore 60 which extends through the center thereof.

Each end cap 50,52 has a cylindrical wedge shape with a wedge shaped cross sectional shape with a thicker side and a narrow side. The opposite ends of each end cap 50,52 are preferably oriented at approximately a 20 degree angle with respect to each other. As best seen in FIG. 6, the end caps 50,52 are preferably attached to the ends of the core 53 so that their thick ends are oriented in opposite directions and so that the end surface 62 of upper end cap 50 is parallel to the end surface 64 of lower end cap 52.

The bushings 20 are then mounted on the support disc 36 with the thick side of end cap 52 oriented towards the tire 42. Thus, the central axis 58 of the bushing 20 will extend upwardly approximately 30 degrees to the rear with respect to a vertical axis, and will extend upwardly approximately 20 degrees away from the tire 42. When the tire 42 is lined up parallel to the fore-and-aft axis of the tractor, the upwardly extending portion of the central axis 58 of the bushing 20 will be tilted to the rear and laterally inwardly away from the tire 42.

These angles provide clearance between fender 10 and tire 42 during deflection of the fender 10. Threaded bores (not shown) are formed in each end cap to receive capscrews for attachment to the support disc 36 of the mounting bracket 22.

Figure 9:
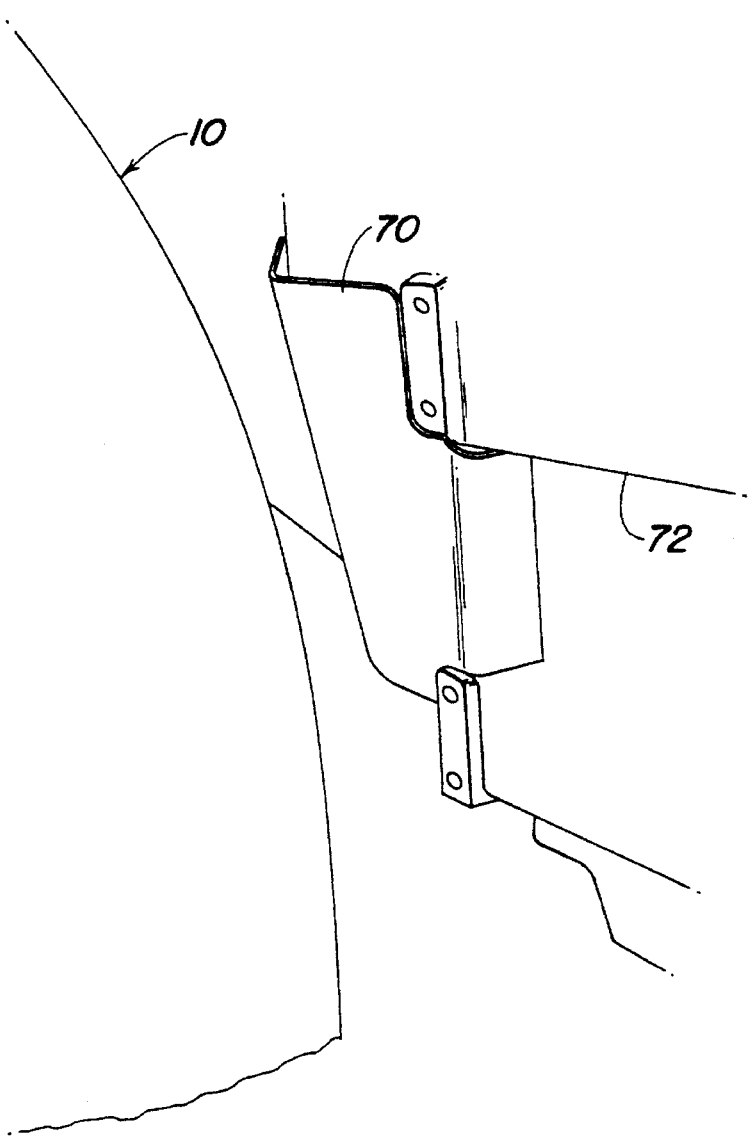
FIG. 9 is a perspective view showing the guard panel feature of the present invention.

As best seen in FIG. 9, a flexible mar resistant guard panel 70 is mounted on a body panel 72 of the tractor. The guard 70 is positioned so that when the wheel 42 is turned, the fender 10 will engage the guard 70, thus preventing damage to the body panel 72 or to the fender 10.

With the rubber spring/damper 20 between the fender support arms 14,16 the mounting bracket 22 allows for pivoting or bending of the fender 10 with respect to the wheel 42 when the fender 10 comes in contact with the guard 72. The guard 70 on the body panel 72 provides a smooth and consistent contact surface for the fender 10, independent of turn angle, oscillation angle, tread width and tire size. The rubber spring/damper 20 and guard panel 70 allows for maneuverability of a vehicle with fenders to be equal to its maneuverability without fenders at all tread settings and tire sizes. This approach does not require adjustments to be made within the fender assembly and does not require placement of a stop based on tire sizes and tread settings. The flexibility of the rubber spring/damper 20 to bend as well as pivot around its axis isolates or dampens the fender 10 and structure from fatigue of hard shocks from axle and tire dynamics. The geometry of the fender mount pivot allows for greater deflection of the fender 10 and supporting structure 12, resulting in greater tire turn angle, without the fender 10 interfering with wide tires. The pivot geometry of the present invention effectively lifts the fender 10 as it is deflected, thereby maintaining adequate clearance through a greater range of deflection.

While the present invention has been described in conjunction with a specific embodiment, it is understood that many alternatives, modifications and variations will be apparent to those skilled in the art in light of the foregoing description. Accordingly, this invention is intended to embrace all such alternatives, modifications and variations which fall within the spirit and scope of the appended claims.

What is claimed is:

1. In a vehicle having a steerable wheel on an axle, a fender, and a fender mount for supporting the fender on the axle adjacent to the steerable wheel, the fender mount having a bracket fixed to a portion of the axle which pivots with the wheel, an arm fixed to the fender and a flexible member having a first end attached to the bracket and having a second end attached to the arm, characterized by:

the flexible member comprising a bushing being rotatably flexible about a torsion axis and being bendably flexible in directions transverse to the torsion axis, the bushing having a central axis which extends upwardly and rearwardly with respect to a vertical plane containing a rotation axis of the wheel.

2. The fender mount of claim 1, wherein:

the central axis of the bushing extends upwardly and inwardly away from the wheel.

3. The fender mount of claim 1, wherein the bushing comprises:

a flexible core; and a pair of wedge-shaped end caps fixed to opposite ends of the core.

4. The fender mount of claim 3, wherein:

each end cap has a thicker side and a narrower side; and the end caps are fixed to the core so that their thicker sides are oriented in opposite directions.

5. The fender mount of claim 1, further comprising:

a fixture having a base fixed to an upper end of the bushing and a plate extending from the base, the plate being fixed to an inner end of the arm.

6. In a vehicle having a steerable wheel on an axle, a fender, and a fender mount for supporting the fender on the axle adjacent to the steerable wheel, the fender mount having a bracket fixed to a portion of the axle which pivots with the wheel, an arm fixed to the fender and a flexible member having a first end attached to the bracket and having a second end attached to the arm, characterized by:

the flexible member comprising a bushing which comprises a flexible core and a pair of wedge-shaped end caps fixed to opposite ends of the core.

7. The fender mount of claim 6, wherein:

each end cap has a thicker side and a narrower side; and the end caps are fixed to the core so that their thicker sides are oriented in opposite directions.

8. In a vehicle having a steerable wheel on an axle, a fender, an arm with an outer end fixed to the fender, and a fender mount for supporting the fender on the axle adjacent to the steerable wheel, the fender mount having a flexible member coupled between the axle and the arm, characterized by:

the flexible member comprises a bushing being rotatably flexible about a torsion axis and being bendably flexible in directions transverse to the torsion axis, the bushing comprising a flexible core, and a pair of wedge-shaped end caps fixed to opposite ends of the core;

a fixture having a base fixed to one of the end caps and a plate extending from the base, the plate being fixed to an inner end of the arm; and a bracket comprising a base fixed to another of the end caps and a support plate fixed to a part of the axle which pivots with the wheel as it is steered.

9. The fender mount of claim 8, wherein:

the bushing has a central axis which extends upwardly and rearwardly with respect to a vertical plane which contains a rotation axis of the wheel.

10. The fender mount of claim 8, wherein:

the bushing has a central axis which extends upwardly and inwardly away from the wheel.

11. The fender mount of claim 8, wherein:

the bushing has a central axis which extends upwardly and rearwardly with respect to a vertical plane which contains a rotation axis of the wheel and which upwardly and inwardly away from the wheel.

12. In a vehicle having a steerable wheel on an axle, a fender, an arm with an outer end fixed to the fender, and a fender mount for supporting the fender on the axle adjacent to the steerable wheel, the fender mount having a flexible member coupled between the axle and the arm, characterized by:

the flexible member comprises a bushing being rotatably flexible about a torsion axis and being bendably flexible in directions transverse to the torsion axis, the bushing having a central axis which extends upwardly and rearwardly with respect to a vertical plane containing a rotation axis of the wheel and which extends upwardly and inwardly away from the wheel;

a fixture having a base fixed to an upper end of the bushing and a plate extending from the base, the plate being fixed to an inner end of the arm; and a bracket comprising a base fixed to a lower end of the bushing and support plate fixed to a part of the axle which pivots with the wheel as it is steered.

* * * * *